United States Patent [19]
Parr

[11] 3,942,847
[45] Mar. 9, 1976

[54] TEMPERATURE COMPENSATING CERAMIC METAL BEARING SYSTEMS

[75] Inventor: Norman Lawrence Parr, Surbiton, England

[73] Assignee: National Research Development Corporation, London, England

[22] Filed: Jan. 18, 1974

[21] Appl. No.: 434,645

[30] Foreign Application Priority Data
Jan. 19, 1973 United Kingdom............... 2780/73

[52] U.S. Cl. .................... 308/9; 308/122; 308/238
[51] Int. Cl.² ......................................... F16C 1/24
[58] Field of Search .......... 308/9, 122, 238, DIG. 1, 308/DIG. 8, DIG. 9

[56] References Cited
UNITED STATES PATENTS

| | | | |
|---|---|---|---|
| 3,150,822 | 9/1964 | Dreyfus et al. ................ | 308/DIG. 1 |
| 3,194,616 | 7/1965 | Oprecht .......................... | 308/238 X |
| 3,238,000 | 3/1966 | Muljderman et al. .......... | 308/240 X |
| 3,284,144 | 11/1966 | Moore et al. ................... | 308/238 X |
| 3,494,674 | 2/1970 | Muljderman et al. .......... | 308/9 |

FOREIGN PATENTS OR APPLICATIONS

| | | | |
|---|---|---|---|
| 1,204,042 | 10/1958 | France .............................. | 308/238 |

*Primary Examiner*—M. Henson Wood, Jr.
*Assistant Examiner*—Gene A. Church
*Attorney, Agent, or Firm*—Cushman, Darby & Cushman

[57] ABSTRACT

The invention concerns a temperature compensating bearing for a shaft in which an expandable helical ceramic member is provided between the shaft and the bearing housing. The expandable helical ceramic member functions by expanding and contracting sympathetically with any changes in shaft diameter due to change of temperature of the bearing.

11 Claims, 3 Drawing Figures

TEMPERATURE COMPENSATING CERAMIC METAL BEARING SYSTEMS

This invention relates to temperature compensating bearing assemblies and in particular to temperature compensating ceramic/metal bearing assemblies.

An alleviation of strict design and operating criteria for bearing technology by the use of inorganic non-metallic to metallic mating surfaces in critical components of bearing systems has been described in British Pat. No. 1,310,274. The precise choice of metallic and inorganic non-metallic components depends upon operating loads, speeds and invironments, but where high temperatures are involved the preferred inorganic non-metallic material must have a combination of high temperature strength, low co-efficient of friction and high resistance to fracture by thermal stress or thermal shock. Such properties are obtainable in reaction-bonded or hotpressed silicon nitride and its derivatives.

One of the chief virtues of using such combinations of materials in gas bearing technology is to permit fortuitous touch-down without causing catastrophic failure by seizing or galling as is normal to total metallic systems. The use of inorganic non-metallic materials with metals will thus permit the possibility of a bearing operation passing from a plain journal unlubricated system to a self-pressurised gas bearing system as shaft speed is increased with or without the use of jacking gas.

The chief problems attendant with the use of mixed metallic/inorganic non-metallic materials in systems expected to operate over temperature ranges is the inherent difference in co-efficients of thermal expansion. In order, therefore, to avoid loss of close tolerance of clearances, or to avoid fracture loads imposed by thermal expansion mismatch, it is necessary to provide means for the sympathetic compensation of dimension changes consequent upon temperature gradients and levels.

The present invention relates to a temperature compensating bearing for a shaft or a like movable member in which an expandible helical ceramic member is employed intermediate between the shaft and a housing therefor.

When the invention is applied to gas bearing assemblies it is very desirable to provide end sealing covers on plates which are arranged to fit closely around the shaft to restrict the loss of gas pressure from within the bearing of gas pressure from within the bearing assembly. Presurisation of the bearing assembly may with advantage be aided by the provision on the bearing surface of the shaft of a helical groove arranged in counterdirection to the helix angle of the expandible helical ceramic member.

When the invention is applied to a dry bearing assembly required to operate over a wide temperature range it may include a graphitic material located within the space provided by the gap in the expandible helical ceramic member, which graphitic material will then be dispursed over the bearing surfaces during operation if the bearing as a lubricating film of graphite.

The expandible helical ceramic member is preferably of silicon nitride and may be fabricated by any of the known fabrication techniques.

In order that the present invention may be more fully understood embodiments thereof will now be described, by way of example, with reference to the accompanying drawings, in which.

Figure 1:
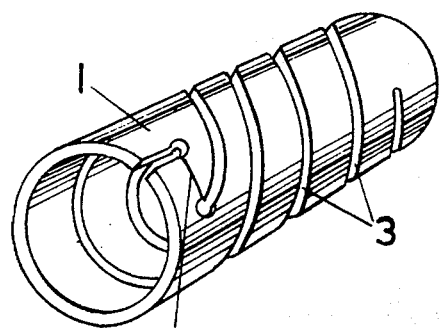
FIG. 1 is a perspective view of the ceramic helical member.
Figure 2:
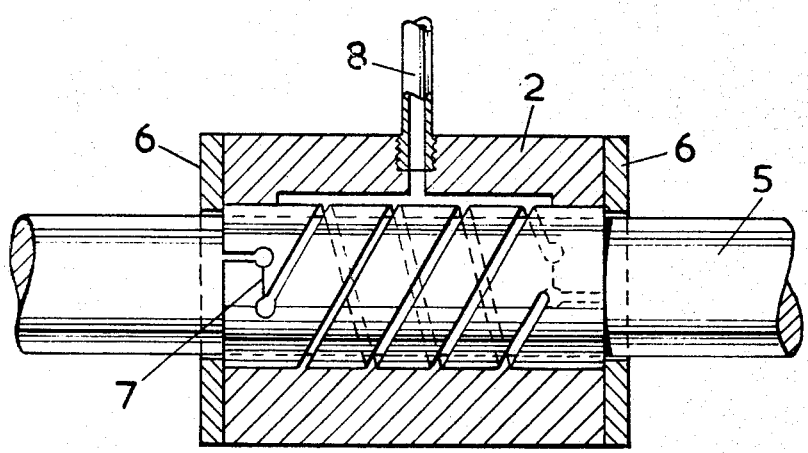
FIG. 2 illustrates a bearing in accordance with the present invention.
Figure 3:
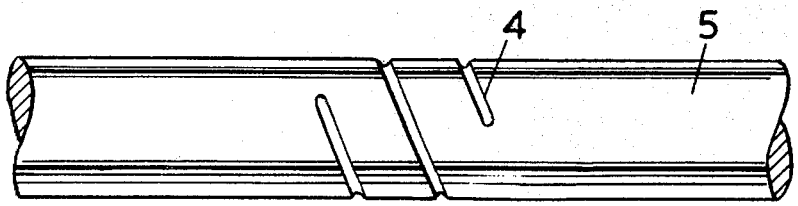
FIG. 3 is a perspective view of a modified shaft.

Referring to the drawings, an expandible helical ceramic member 1 is designed to operate by expanding and contracting sympathetically with change in shaft diameter with change in temperature whilst maintaining gas clearances with the bearing surfaces on the metal housing 2. The helical gap 3 formed in the helical ceramic member 1 acts also to assist to even out the gas pressure in the bearing and also provide a degree of pumping action. This pumping action can be further enhanced by forming a counter helical groove 4 in the shaft 5, as shown in FIG. 3. It is necessary to provide end sealing arrangements to the bearing, in order to maintain gas pressures within the bearing demanded by the required bearing stiffness, and cover plates 6 fitting close to the surface of the shaft to restrict gas flow are provided for that purpose. Alternatively, separate split collars with close tolerances can be provided at each end of the bearing, as described in U.S. Pat. No. 1,310,274.

The helical ceramic member may be formed of silicon nitride by the flame-spray deposition of fine silicon powder onto a polished mandrel previously coated with a soluble release agent, as described in U.S. Pat. No. 1,138,284. The helix is then ground externally, whilst still on the mandrel, and is then released and reaction bonded to silicon nitride by heating in nitrogen and then lightly finished to final dimensions by polishing. The circumferential shots 7 in the helix may be made by stretching thin foil (eg 0.0001 inch) between sets of removable split pegs fitted into the mandrel before spray deposition. The bearing may be self-pressurised due to the counter helical groove in the shaft, assisted by the helical gap in the ceramic helix, or jacking gas may be supplied to the bearing through a conduit 8 passing through the housing.

The invention may be used in a modified form for use in rotational or reciprocating shaft dry journal bearings to operate over wide temperature ranges, particularly if a graphic spiral for dispensing graphite films over the surface of the shaft is enclosed in the space provided by the gap in the ceramic helix.

Further specific fabrication techniques for producing silicon nitride bodies that are applicable to the fabrication of the expandible helical ceramic member are described in British Pat. No. 1,021,053 and pending British Pat. No. 52445/72.

I claim:

1. A temperature compensating bearing assembly for a shaft comprising a bearing housing, and an expandable helical ceramic member located within said bearing housing and providing a bearing surface.

2. A temperature compensating bearing assembly as claimed in claim 1 in which the expandable helical ceramic member is fabricated from silicon nitride.

3. A temperature compensating bearing assembly as claimed in claim 1 in which said bearing surface is comprised in part of the expandable helical ceramic member and in part of a helical spiral of graphitic material, said helical spiral of graphitic material being located in the helical spiral of the expandable helical ceramic member.

4. A temperature compensating bearing assembly as claimed in claim 3 in which the expandable helical ceramic member is fabricated from silicon nitride.

5. A temperature compensating bearing assembly comprising an expandable helical ceramic member located within said bearing housing and providing a first opposed bearing surface and a shaft located within said expandable helical ceramic member and including a second opposed bearing surface opposed to said first bearing surface.

6. A temperature compensating bearing assembly as claimed in claim 5 in which said second opposed bearing surface includes a helical groove arranged in an angled direction in counter-direction to the helix angle of the expandable helical ceramic member.

7. A temperature compensating bearing assembly as claimed in claim 5 including end sealing cover plates located at the ends of the bearing housing and arranged to fit closely around the shaft.

8. A temperature compensating bearing assembly as claimed in claim 6 including end sealing cover plates located at the end of the bearing housing and arranged to fit closely around the shaft.

9. A temperature compensating bearing assembly as claimed in claim 5 in which the expandable helical ceramic member is fabricated from silicon nitride.

10. A temperature compensating bearing assembly as claimed in claim 6 in which the expandable helical ceramic member is fabricated from silicon nitride.

11. A temperature compensating bearing assembly as claimed in claim 7 in which the expandable helical ceramic member is fabricated from silicon nitride.

* * * * *

UNITED STATES PATENT OFFICE
CERTIFICATE OF CORRECTION

Patent No. 3,942,847     Dated   March 9, 1976

Inventor(s)   Norman L. Parr

It is certified that error appears in the above-identified patent and that said Letters Patent are hereby corrected as shown below:

Column 1, line 62, delete "if" insert --of--.

Column 2, lines 25 and 30, delete "U.S." and insert --British--.

Column 3, line 5, after "comprising" insert --a bearing housing--.

Signed and Sealed this

Twenty-second Day of February 1977

[SEAL]

Attest:

RUTH C. MASON
*Attesting Officer*

C. MARSHALL DANN
*Commissioner of Patents and Trademarks*